United States Patent
Fong et al.

(10) Patent No.: US 7,357,095 B1
(45) Date of Patent: Apr. 15, 2008

(54) TRANSPARENT EDGE-LIGHTED INSTRUMENT CLUSTER

(75) Inventors: Ching Fong, Canton, MI (US); Zinoviy Kelman, Bloomfield Hills, MI (US)

(73) Assignee: Yazaki North America, Inc., Canton, MI (US)

( * ) Notice: Subject to any disclaimer, the term of this patent is extended or adjusted under 35 U.S.C. 154(b) by 317 days.

(21) Appl. No.: 10/818,116

(22) Filed: Apr. 5, 2004

(51) Int. Cl.
*G01D 11/28* (2006.01)

(52) U.S. Cl. ............... 116/286; 116/305; 116/DIG. 36; 362/28

(58) Field of Classification Search ........ 116/285–287, 116/305, DIG. 36, 28 R, 300–301, DIG. 16, 116/62.1, 62.4, DIG. 5, DIG. 6; 362/26–30, 362/85

See application file for complete search history.

(56) References Cited

U.S. PATENT DOCUMENTS

| | | | | |
|---|---|---|---|---|
| 1,999,429 A | * | 4/1935 | Tibbetts | 180/90 |
| 2,085,887 A | * | 7/1937 | Atkinson | 362/26 |
| 2,837,053 A | * | 6/1958 | Viret | 116/287 |
| 2,900,949 A | * | 8/1959 | Baker | 116/288 |
| 3,143,098 A | * | 8/1964 | Blackwell | 116/288 |
| 4,044,708 A | | 8/1977 | Klein | |
| 4,321,655 A | * | 3/1982 | Bouvrande | 362/29 |
| 4,364,596 A | * | 12/1982 | Geisendorfer | 296/91 |
| 4,621,306 A | * | 11/1986 | Sell | 362/29 |
| 4,704,984 A | * | 11/1987 | Mayer | 116/287 |
| 4,782,782 A | * | 11/1988 | Nill | 116/28.1 |
| 5,406,303 A | * | 4/1995 | Salmon et al. | 345/75.1 |
| 5,572,818 A | * | 11/1996 | Churchill | 40/547 |
| 5,741,058 A | * | 4/1998 | Suzuki et al. | 362/27 |
| 5,929,952 A | * | 7/1999 | Bartha | 349/65 |
| 6,317,037 B1 | | 11/2001 | Ayres et al. | |
| 6,382,127 B2 | * | 5/2002 | Wehner | 116/284 |
| 6,404,333 B1 | * | 6/2002 | Ayres et al. | 340/461 |
| 6,520,109 B2 | | 2/2003 | Komura | |
| D491,504 S | * | 6/2004 | Sato et al. | D12/192 |
| 6,817,310 B2 | * | 11/2004 | Sugiyama et al. | 116/62.4 |
| 7,121,674 B2 | * | 10/2006 | Kraus et al. | 362/27 |
| 2004/0129197 A1 | * | 7/2004 | Nakagawa et al. | 116/28 R |

FOREIGN PATENT DOCUMENTS

JP  57-133713 A1  8/1982
JP  2003139581 A  *  5/2003

* cited by examiner

*Primary Examiner*—Richard Smith
*Assistant Examiner*—Amy R. Cohen
(74) *Attorney, Agent, or Firm*—Rader, Fishman & Grauer, PLLC

(57) ABSTRACT

An instrument cluster that is mountable on a top surface of a vehicle dashboard is disclosed. The instrument cluster includes a transparent dial that has indicia engraved thereon. A plurality of light emitting diodes are positioned in a center portion of the transparent dial so as to illuminate the indicia for night time driving. The center portion of the transparent dial further includes a high gloss semi-transparent appliqué that provides a mirror finish. Symbols are incorporated on the appliqué so as to provide indicators in the center portion of the transparent dial when a light source illuminates the symbols of the appliqué.

7 Claims, 4 Drawing Sheets

TRANSPARENT EDGE-LIGHTED INSTRUMENT CLUSTER

BACKGROUND OF THE INVENTION

This invention relates generally to instrument panels. More particularly, this invention relates to a transparent instrument cluster for use on a top surface of an automotive dashboard.

Various types of vehicle instrument panels have been developed for providing critical information to the driver of an automobile, while meeting customer demands with respect to styling. Such instruments include, but are not limited to, speedometers for indicating vehicle speed, tachometers for displaying engine speed, temperature gauges, and fluid level indicators. Instrument panels generally employ face plates with legends and other indicia printed or painted thereon. Pointer devices or needles are mounted on the rotary output shaft of a motor and rotate or move about the face plate in response to the control signal received by the motor to reveal certain vehicle operating parameters to the vehicle operator, such as, for example, vehicle speed.

The appearance of existing automotive instrument panels are lacking in aesthetic appeal. Typically automotive instrument panels are designed for day and night displays. Traditionally, the design includes a black background with the legends and other indicia in a desired color, typically white. The design on the panel may include other colors that are different from the daytime white such that the panel information is visible at night as a result of lighting. Accordingly, there exists a need for a stylish instrument panel that is aesthetically pleasing.

In addition to styling concerns, visibility of the instrument panel is of important concern. More specifically, the operator of the vehicle must be able to periodically see the instrument panel while driving to properly evaluate the operation of the vehicle. Accordingly, instruments panels have traditionally been placed directly below the windshield of a car, in the dashboard, such that the instrument panel is located directly below the operator's driving field of vision. However, to view the instrument panel when driving, the operator must take his or her eyes off the road. When traveling at high rates of speeds, every second the operator takes his or her eyes off the road is a potential danger. In addition, because instrument panels have traditionally been placed in a dashboard, oftentimes the steering wheel will partially obstruct an operator's view of the instrument panels. Thus, the operator has to spend additional time looking away from the road to peer over the steering wheel to see and interpret the information on the instrument panels.

To address the problems of traditional dashboard mounted instrument panels, it has been known to mount instrument clusters on the top surface of the dashboard in the operator's line of vision. However, these instrument clusters must be small to avoid interference with the operator's view of the road, making them harder to read. Accordingly, there exists a need for an improved instrument cluster that is aesthetically pleasing but also has an easy to read face without obstructing the vehicle operator's ability to view the road.

BRIEF SUMMARY OF THE INVENTION

In accordance with the present invention, an instrument cluster for an automotive vehicle for displaying information concerning the operation of the vehicle, such as speed, RPM's and other operational information, is provided that may be mounted high on a vehicle dashboard so as to permit minimum eye movement by the vehicle operator to view the instrument cluster while driving. In addition, the instrument cluster preferably includes at least one transparent dial with indicia engraved thereon such that the vehicle operator may see through the instrument cluster. A printed circuit board and stepper motor cooperate with a plurality of light emitting diodes (LEDs) that are positioned in a center portion of a groove formed in the transparent dial to inject light into the transparent dial so as to backlight the transparent dial and illuminate the indicia for night time driving.

In accordance with another aspect of the invention, the instrument cluster may also be provided with indicator symbols positioned in the center of the transparent dial so as to minimize obstructions to viewing the road. A front mask having an indicator support member is provided that further includes a plurality of cutouts to permit light to shine through in response to certain signals from the vehicle. The support member is sized to generally correspond in size to a channel formed in the front lens of the instrument cluster and includes an appliqué having symbols thereon. The symbols are positioned over the cutouts such that the symbol is illuminated to convey information to the vehicle operator in response to signals received from the vehicle. In accordance with one aspect of the invention, it is preferred that the appliqué is a high gloss semi-transparent appliqué such that it has a mirror finish when the indicator symbols are not lighted up, thereby providing a clean and modernistic looking instrument cluster.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE INVENTION

Figure 1:
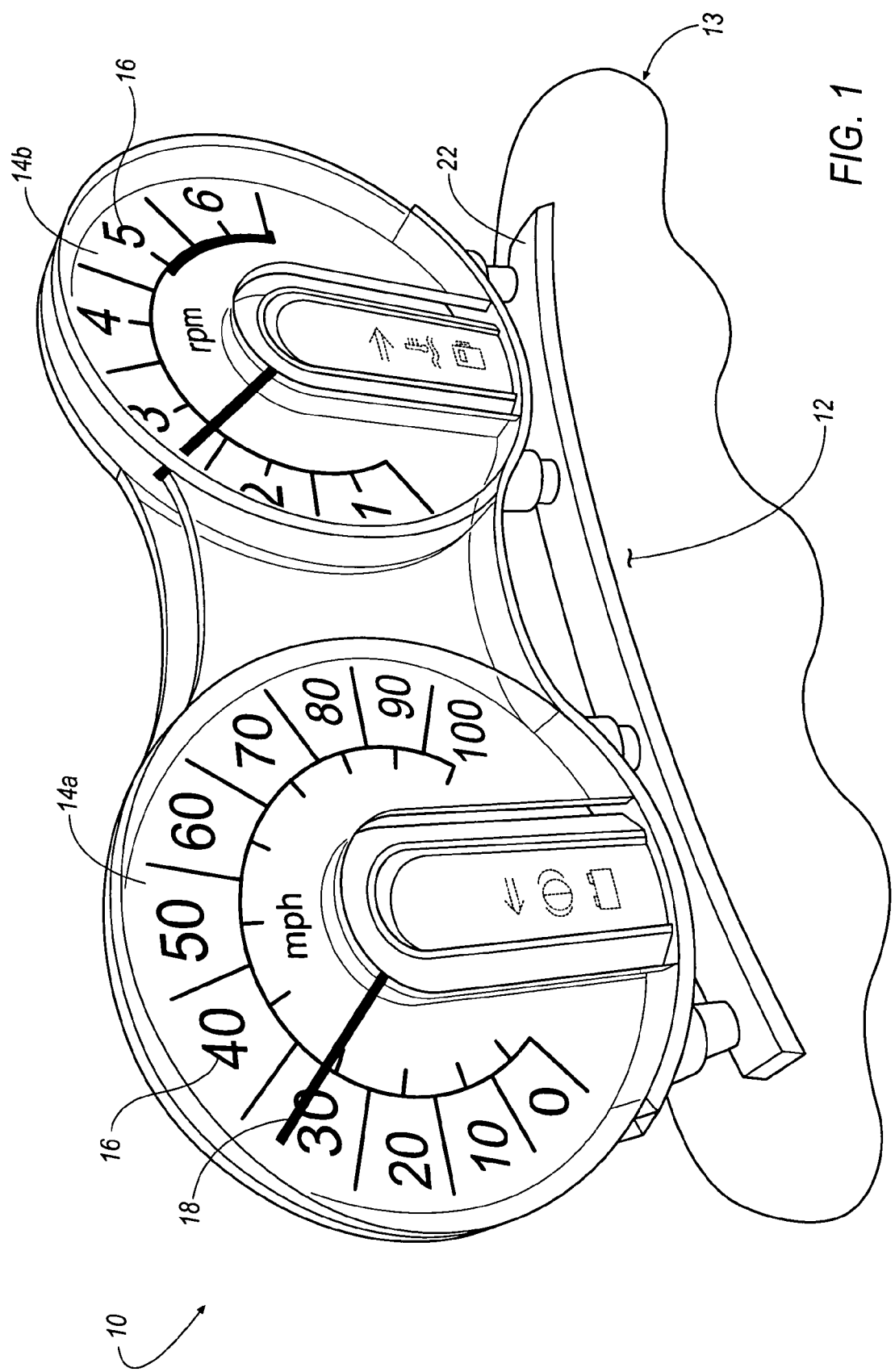
FIG. 1 is a perspective view of a transparent instrument cluster in accordance with the present invention.
Figure 2:
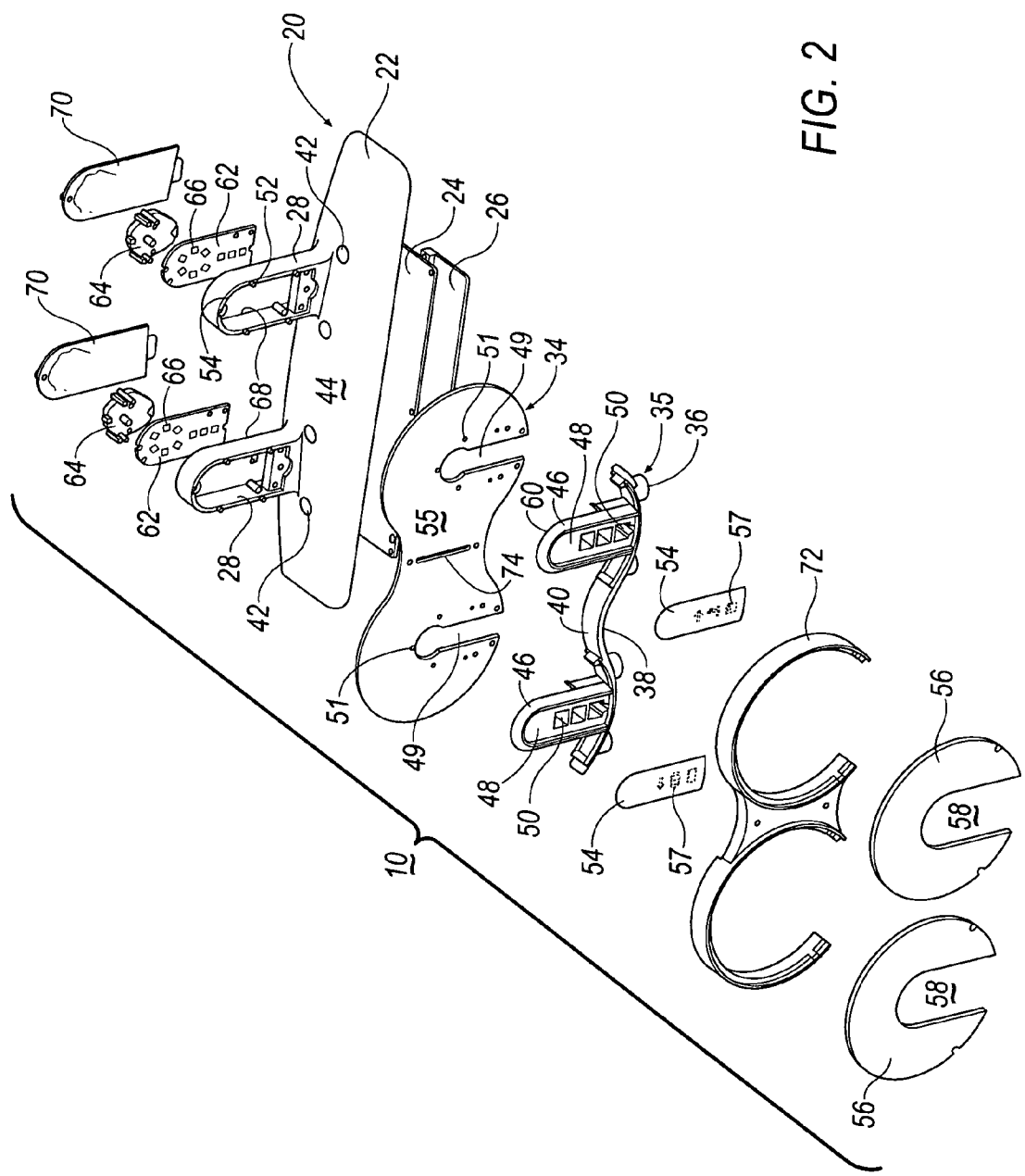
FIG. 2 is an exploded view of the transparent instrument cluster of FIG. 1.

Referring now to the drawings, FIGS. 1 and 2 depict an instrument cluster 10 for displaying information regarding the vehicle's speed, RPMs and other operational information. Instrument cluster 10 is mounted to a top surface 12 of a vehicle dashboard 13 in accordance with the present invention. Instrument cluster 10 includes at least one display panel 14a, 14b having indicia 16 thereon and a needle or pointer 18 associated with each display panel 14a, 14b.

Referring to FIG. 2, the individual components of instrument cluster 10 will be described in further detail. Instrument cluster 10 is supported by a housing assembly 20. Housing assembly 20 includes a base member 22, a printed circuit board 24, and a cover 26. The printed circuit board 24 is positioned within base member 22 with cover 26 operating to secure printed circuit board 24 therein. Base member 22 further includes at least one upwardly extending mounting support 28.

In accordance with one aspect of the invention, a transparent dial 34 is secured to a front mask 35. Front mask 35 includes mounting members 36 on a bottom surface 38 of a base support member 40. Base support member 40 may be curved for aesthetic appearance, as shown in FIG. 1. Mounting members 36 cooperate with mounting apertures 42 formed in a top surface 44 of base member 22 to secure front mask 35 to housing assembly 20. Front mask 35 also includes at least one upwardly extending indicator support 46 that generally corresponds in size and shape to upwardly extending mounting support 28. Indicator support 46 has a closed front surface 48 with one or more cutouts 50 so that light from light members is permitted to pass through to light up indicators such as turn signals and temperature or fuel level warning lights. The surfaces within cutouts 50 are made highly reflective such that light from the light members suffers minimum loss. The light members are operatively connected to printed circuit board 24 through the base member 22 behind each mounting support 28. Printed circuit board 24 serves as a controller for turning light members on and off in response to a signal from the vehicle.

Figure 4:
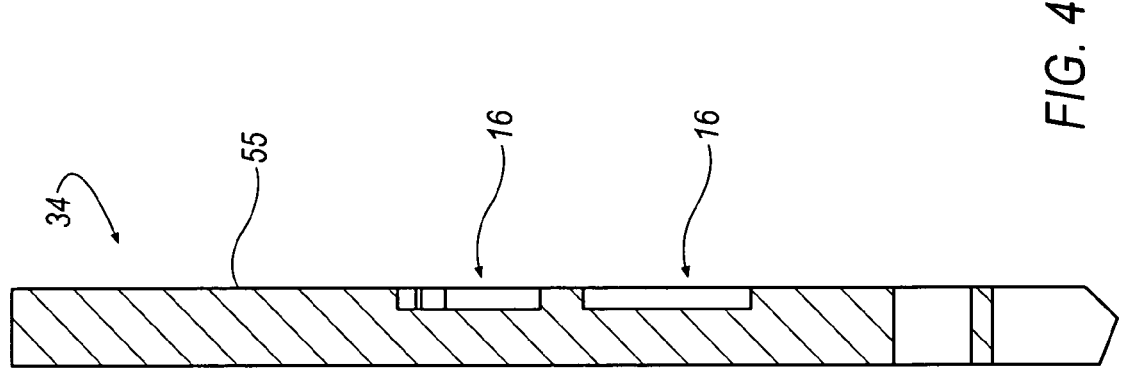
FIG. 4 a cross-sectional view of the transparent dial of FIG. 3 taken along lines 4-4.
Figure 3:
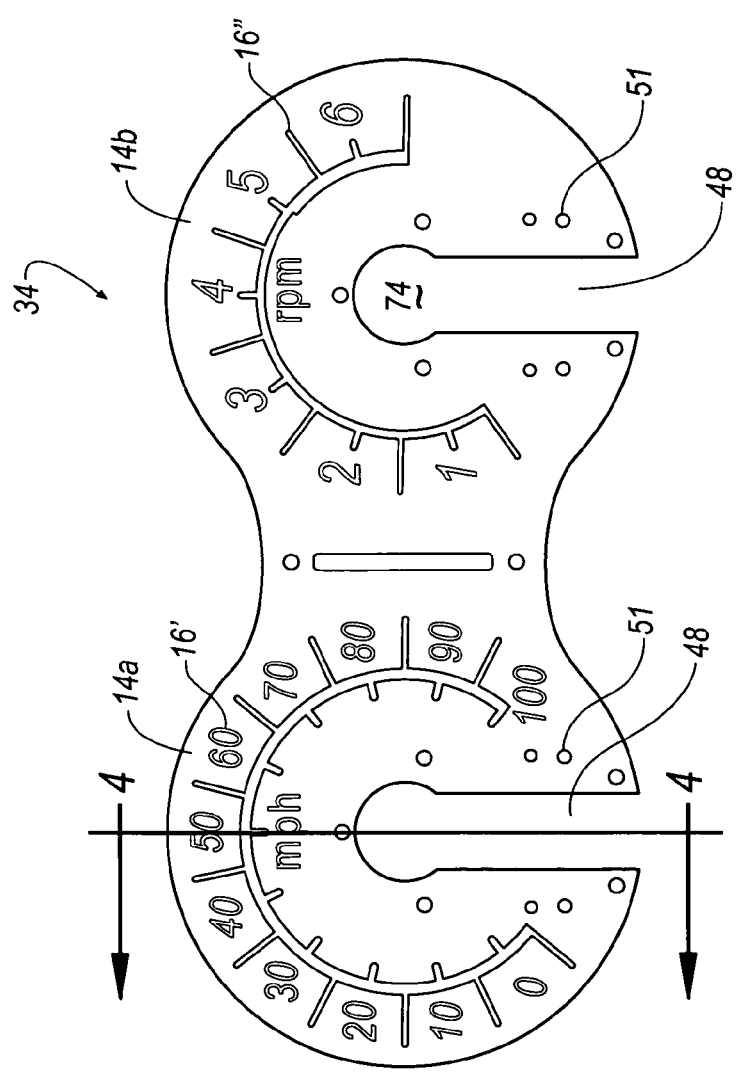
FIG. 3 is a front elevational view of a transparent dial of the present invention.
Figure 5:
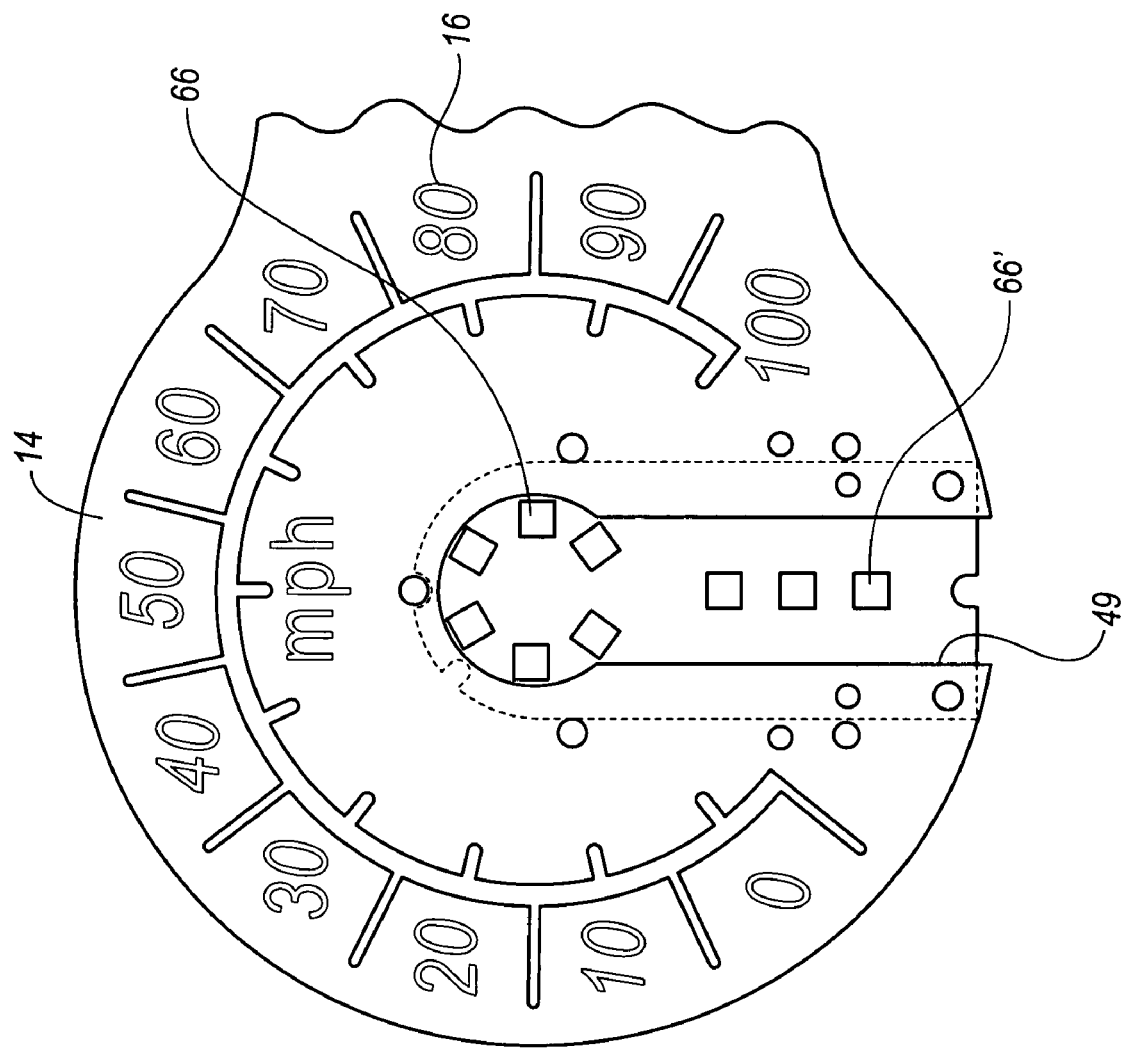
FIG. 5 is a partial front elevational view of the transparent dial with a light source disposed therein.

Transparent dial 34 includes at least one channel 49 formed therein and at least two mounting holes 51 positioned adjacent to channel 49. Mounting holes 51 cooperate with corresponding mounting protuberances 52 formed on a front face 54 of mounting support 28 to secure transparent dial 34 onto mounting support 28 of housing 20 such that transparent dial 34 is sandwiched between mounting support 28 and indicator support 46. In accordance with one aspect of the invention, referring to FIGS. 3 and 4, a front surface 55 of transparent dial 34 further includes indicia 16 such as numerals 16' and tick marks 16" engraved thereon. The engraving be may formed by machining or alternatively, may be incorporated into the injection mold tool used to form transparent dial 34. Engraving indicia 16 is preferred over painting indicia 16 on transparent dial 34 as painted indicia reduces visibility through instrument cluster 10 and may wear off with time.

In accordance with another aspect of the invention, indicator support members 46 may further be provided with a metallic appearance appliqué 54. Appliqué 54 is sized to generally correspond to the size and shape of front surface 48 of indicator support members 46. Appliqué 54 further includes symbols 57 thereon such as a battery, gas pump or turn signal arrow that are positioned over cutouts 50 when appliqué 54 is positioned over front surface 48. It is preferred that appliqué 54 is a high gloss semi-transparent appliqué such that it has the appearance of a mirror when the indicators are not lit to provide a clean, modernistic aesthetic appearance. However, it is understood that other appliqué materials may be employed without departing from the invention.

Transparent dial 34 is covered with a clear front lens 56 to protect front surface 55 of transparent dial 34. Front lens 56 includes a channel 58 that is sized to correspond to be slightly larger than an outer edge 60 of indicator support member 46.

A printed circuit board 62 carries a stepper motor 64 and a pointer 18 (see FIG. 1) operatively connected thereto. Printed circuit board 62 also carries a plurality of light emitting diodes (LEDs) 66. Printed circuit board 62 and stepper motor 64 are secured to a back surface 68 of upwardly extending support members 28 of housing 20 so as to backlight transparent dial 34. A back cover 70 serves to enclose stepper motor 64 and printed circuit board 62 within upwardly extending support member 28. Once assembled, the front lens 56 is press fit into an assembly cover 72, that is preferably clear. The assembly cover 72 is then slid over the indicator support members 46 and secured over the components of instrument cluster 10. Assembly cover 72 has a shape that generally corresponds to the outer periphery of transparent dial 34.

In operation, printed circuit board 24 serves as a controller. It receives signals from the vehicle to operate the LEDs 66. In addition to turning the LEDs on and off, it is also contemplated multiple colored LEDs may be employed such that printed circuit board 62 may illuminate only certain colors in response to certain vehicle conditions. For example, if the speed of the vehicle exceeds 65 MPH, red tinted LEDs may turn on. If the speed of the vehicle is below 65 MPH, blue tinted LEDs may illuminate transparent dial 34.

Some of the LEDs 66 are oriented to provide light beams in the same direction as the plane of transparent dial 34. As such, light from these LEDs 66 positioned at the center 74 of transparent dial 34 inject the light beams into transparent dial 34 to backlight engraved indicia 16, thereby lighting up engraved indicia 16 for night time driving. The LEDs 66' positioned in line with the cutouts 50 are oriented to light the symbols 57 in response to certain operational characteristics of the vehicle.

In accordance with the present invention, because transparent dial 34 is transparent, as is front lens 56, a vehicle operator may see through instrument cluster 10. Accordingly, instrument cluster 10 may be positioned on dashboard 12 so as to allow minimum eye movement of the vehicle operator to view the vehicle's operational data without taking his or her eyes completely off the road. In addition, because indicator symbols 57 are positioned in channel 58 of front lens 56, they are easily viewable to the vehicle operator while driving, but only minimally effect visibility.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An instrument cluster for providing information concerning the operation condition of a vehicle, comprising:
   a transparent dial having indicia engraved thereon to collectively provide an unobstructed view from a first side of the instrument cluster to a second side of the instrument cluster through said transparent dial and engraved indicia;
   a motor operatively connected to a pointer;
   a plurality of light emitting diodes positioned in a center portion of a channel formed in said transparent dial;
   a front mask positioned in front of said transparent dial, said front mask including an appliqué positioned thereon over said plurality of light emitting diodes, said appliqué includes one or more symbols thereon and said symbols are positioned over cutouts formed through said front mask such that at least one of said plurality of light emitting diodes illuminates said symbols in response to signals from the vehicle; and
   at least one controller for receiving a signal indicative of a condition of the vehicle, said controller controlling said motor based on said signal to move said pointer and turning said plurality of light emitting diodes on;
   wherein at least some of said plurality of light emitting diodes are oriented to emit light in a same direction of a plane of said transparent dial, said light being receivable by said transparent dial so as to illuminate said indicia engraved in said transparent dial, said illuminated engraved indicia being visually discernable from said transparent dial.

2. The instrument panel of claim 1, wherein said plurality of light emitting diodes includes at least one set of first colored light emitting diodes and a second set of second colored light emitting diodes.

3. The instrument panel of claim 1, wherein said appliqué is semitransparent and has a high gloss.

4. The instrument panel of claim 1, wherein said indicia is engraved on a front surface of said transparent dial.

5. An instrument cluster for providing information concerning the operation condition of a vehicle, comprising:
   a transparent dial having indicia thereon to collectively provide an unobstructed view from a first side of the instrument cluster to a second side of the instrument cluster through said transparent dial and indicia;
   a support member located in a groove in a center portion of said transparent dial inward from said indicia;
   a printed circuit board secured to said support member;
   a motor carried by said printed circuit board and operatively connected to a pointer; and
   a plurality of light emitting diodes carried by said printed circuit board, said printed circuit board being configured to receive a signal indicative of a condition of the vehicle, said printed circuit board controlling said motor based on said signal to move said pointer and turning said plurality of light emitting diodes on;
   a front mask positioned in front of said transparent dial, said front mask including a center portion with an indicator support corresponding in size and shape to said support member and having an appliqué positioned thereon, said appliqué includes one or more symbols thereon and said symbols are positioned over cutouts formed in said indicator support such that light from said plurality of light emitting diodes illuminates said symbols in response to signals from the vehicle;
   wherein said plurality of light emitting diodes are oriented on said printed circuit board to emit light in a same direction of a plane of said transparent dial, said light being receivable by said transparent dial so as to illuminate said indicia on said transparent dial, said illuminated indicia being visually discernable from said transparent dial.

6. The instrument cluster of claim 5, wherein said plurality of light emitting diodes includes at least one subset of first colored light emitting diodes and a second subset of second colored light emitting diodes, said first subset turning on in response to a first operational condition and said second subset turning on in response to a second operational condition.

7. The instrument panel of claim 5, wherein said appliqué is semi-transparent and has a high gloss.

* * * * *